W. GAETHJE.
FLOWER STAND.
APPLICATION FILED JULY 9, 1910.
976,061.
Patented Nov. 15, 1910.
2 SHEETS—SHEET 1.
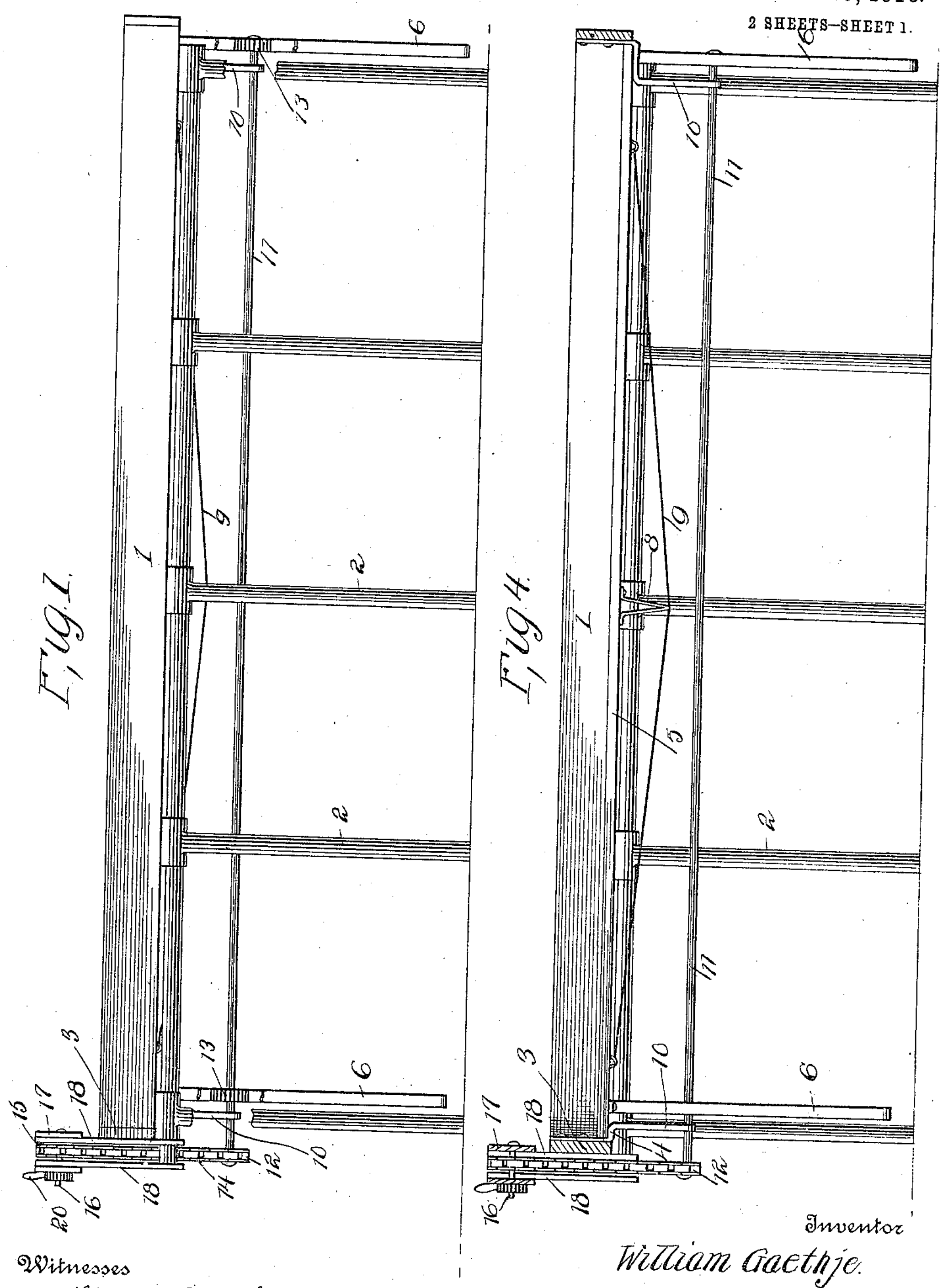
Witnesses
William Smith
E. Edmonstorf
Inventor
William Gaethje.
By Victor J. Evans
Attorney
THE NORRIS PETERS CO., WASHINGTON, D. C.

W. GAETHJE.
FLOWER STAND.
APPLICATION FILED JULY 9, 1910.
976,061.
Patented Nov. 15, 1910.
2 SHEETS—SHEET 2.
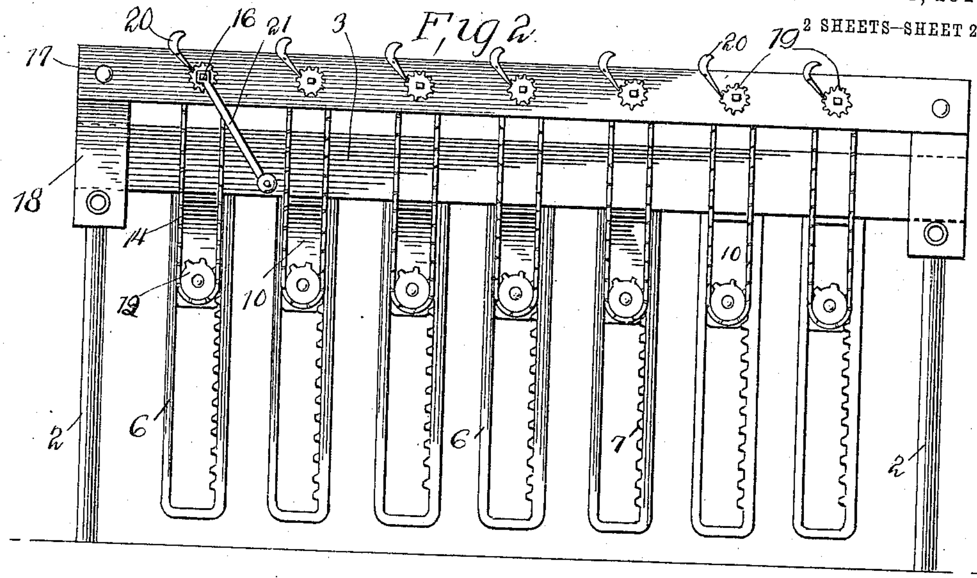
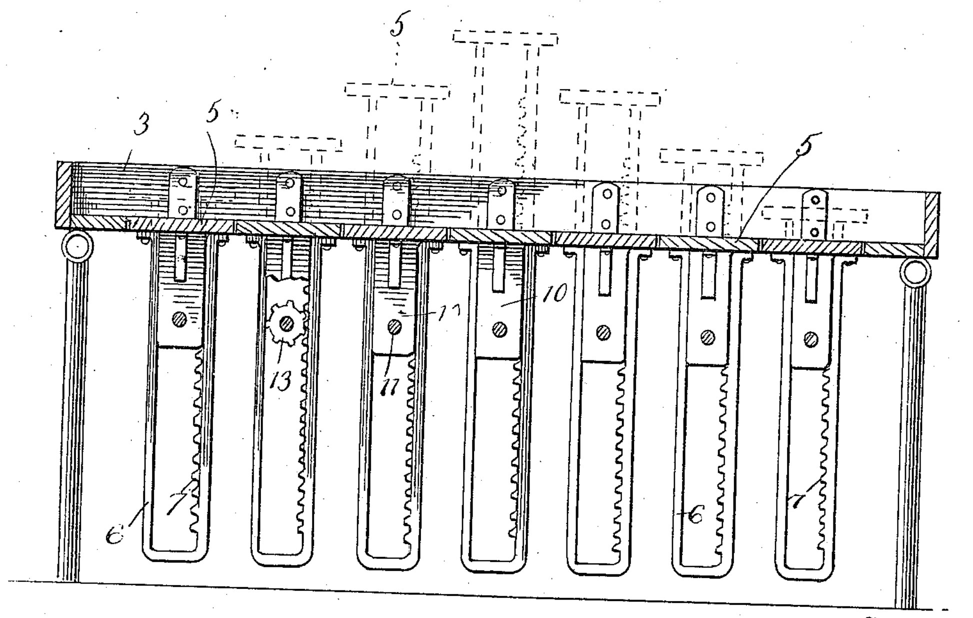
Witnesses
William Smith
[signature]
Inventor
William Gaethje.
By Victor J. Evans
Attorney
THE NORRIS PETERS CO., WASHINGTON, D. C.

UNITED STATES PATENT OFFICE.

WILLIAM GAETHJE, OF SOUTH ROCK ISLAND, ILLINOIS.

FLOWER-STAND.

976,061. Specification of Letters Patent. Patented Nov. 15, 1910.

Application filed July 9, 1910. Serial No. 571,183.

*To all whom it may concern:*

Be it known that I, WILLIAM GAETHJE, a citizen of the United States, residing at South Rock Island, in the county of Rock Island and State of Illinois, have invented new and useful Improvements in Flower-Stands, of which the following is a specification.

This invention relates to flower stands and particularly to that type which are used by florists in propagating houses and the like.

The object of the invention is the provision of a device of this character whereby young plants may be supported in close proximity to one another and the respective rows of plants raised or lowered from the succeeding rows, so that each row of plants will be free and permitted to grow unhindered by the remaining rows, thereby producing perfect plants.

A further object of the invention is the provision of a device of this character whereby the succeeding rows of plants may be raised one from the other so that the plants may be exhibited to their best advantage and whereby the florist or grower is assisted in getting the plants from the middle of the table.

Further objects of the invention will appear as the following specific description is read in connection with the accompanying drawings which form a part of this application, and in which:

Figure 1 is a side elevation. Fig. 2 is an end elevation. Fig. 3 is a transverse sectional view showing in full lines the position of the parts when all the sections are in line and in dotted lines when the sections are arranged in echelon. Fig. 4 is a longitudinal section through one of the sections.

Referring more particularly to the drawings 1 represents a frame which is preferably rectangular in outline and is supported above the ground by the legs 2. The inner side of the frame has its ends 3 provided with inwardly extending flanges 4 which support the pot holding sections 5 of which there may be any number. These sections are arranged to normally rest upon the flanges 4 and when in alinement to form a flat table have their edges arranged closely adjacent to one another but sufficiently far apart to permit the water which may run out of the pots from collecting upon the table. Each end of the sections is provided with a depending yoke member 6 which is provided with a rack bar 7 on one of its legs, the rack bar on the yoke member 6 at one end of each section being arranged on the same leg at the opposite end and each section is provided with a bracing strut 8 in its center and a guy wire or cable 9 which extends from the ends and passes over the strut 8. In this manner the center of the sections is properly supported in horizontal position and prevented from sagging.

Depending from the ends of the frame are bracket arms 10 having journaled therein the longitudinal shafts 11 upon the ends of which are secured the sprocket wheels 12 and the gears 13. These gears 13 mesh with the rack bars 7 and are prevented from disengagement therewith by the opposite leg of the yoke member. The sprocket wheels 12 have passing thereover the endless chains 14 which are driven by sprocket wheels 15 carried upon the stub shaft 16 journaled in the gear frame 17 which is mounted upon the upwardly extending arms 18 carried by one end. These stub shafts have secured thereto outside of the frame 17 ratchet wheels 19 which are adapted to be engaged by the pawls 20 and the ends of the shafts are square so as to receive an operating crank 21. By revolving the crank 21 the shafts 11 are also revolved and the gears 12 are caused to engage the rack bars and raise the sections as desired. The longitudinal shafts cause both ends of the section to raise or lower evenly and as each section is conveniently movable, they may be arranged in echelon or in any other suitable manner, for instance, the center section may be raised to its fullest height and the other sections stepped upon any suitable degrees to the side sections which will rest upon the flanges 4. Again, each alternate section may be raised or lowered from the adjacent sections or one-half of the sections may be raised and the other half lowered.

Having thus described the invention, what is claimed is—

1. In combination, a frame, a plurality of pot supporting members mounted therein, means for adjusting said members independently, and means for holding said members in adjusted position.

2. In a device of the class described, a frame, a plurality of pot supporting members, means for supporting said members in alinement, means for independently raising said members, and means for independently holding the sections in raised position.

3. In a device of the class described, a frame, a plurality of pot supporting members mounted in the frame, yoke members carried by said members and having rack bars therein at each end, independent shafts journaled in the frame and having gears to engage the rack bars, and means to independently operate each shaft for raising or lowering the members.

4. In a device of the class described, a frame, a plurality of pot supporting members mounted in the frame, yoke members carried by said members and having rack bars therein at each end, independent shafts journaled in the frame and having gears to engage the rack bars, means to independently operate each shaft for raising or lowering the members, and means for holding the members in raised position.

In testimony whereof I affix my signature in presence of two witnesses.

WILLIAM GAETHJE.

Witnesses:
JOHN RINCK,
JOHN E. FLEMING.